(12) United States Patent
Kurosawa et al.

(10) Patent No.: US 6,906,903 B2
(45) Date of Patent: Jun. 14, 2005

(54) PROTECTION RELAY

(75) Inventors: Yasuhiro Kurosawa, Hino (JP); Hidenari Amo, Tama (JP); Hideyuki Takani, Kawagoe (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/085,708

(22) Filed: Mar. 1, 2002

(65) Prior Publication Data
US 2002/0149893 A1 Oct. 17, 2002

(30) Foreign Application Priority Data
Mar. 2, 2001 (JP) ......................................... 2001-057948

(51) Int. Cl.[7] ................................................ H02H 9/06
(52) U.S. Cl. ...................... 361/119; 361/118; 361/120; 361/93.1; 361/54
(58) Field of Search ................................. 361/119, 117, 361/118, 120, 103, 106, 93.1, 124, 127, 54, 56, 57, 91.1, 115, 63, 65, 67, 79, 44

(56) References Cited

U.S. PATENT DOCUMENTS 3,976,920 A * 8/1976 Eriksson et al.
4,093,977 A * 6/1978 Wilson
5,796,630 A * 8/1998 Maeda et al.
6,473,723 B1 * 10/2002 Cheng

FOREIGN PATENT DOCUMENTS

EP 0718949 A1 6/1996

* cited by examiner

Primary Examiner—Dean A. Reichard
Assistant Examiner—Nguyen T. Ha
(74) Attorney, Agent, or Firm—Oblon, Spivak, McClelland, Maier & Neustadt, P.C.

(57) ABSTRACT

A protection relay for determining whether or not a fault point of a power system exists in a predetermined range including a filter section for inputting sampling data of a voltage and a current in the power system to a digital filter having a predetermined transfer function and outputting a first voltage data and a first current data, and a second voltage data and a second current data normal to the first voltage data and the first current data, respectively, a calculator for calculating a predetermined measurement value based on the first and second voltage data, and the first and second current data at a first time and the first and second voltage data, and the first and second current data at a second time different from the first time, and an operation decision section for performing an operation decision based on the predetermined measurement value obtained by the calculator.

11 Claims, 8 Drawing Sheets

PROTECTION RELAY

CROSS-REFERENCE TO RELATED APPLICATIONS

This application is based upon and claims the benefit of priority from the prior Japanese Patent Application No. 2001-057948, filed Mar. 2, 2001, the entire contents of which are incorporated herein by reference.

BACKGROUND OF THE INVENTION

1. Field of the Invention

The present invention relates to a protection relay in which an influence of distortion component of fault current generated by a fault in a power system is suppressed.

2. Description of the Related Art

Generally, a protection relay is used to monitor a power system. A main technical subject of such a protection relay is to reduce an influence of harmonics in fault current and fault voltage generated in a fault in a system contained in a signal inputted from the system.

Particularly because charging capacity of a system is increased in underground power transmission cable, phase modifying capacitor and the like, the order of generated harmonics tends to be lowered.

Thus, if it is intended to secure a desired damping amount according to a conventional method for damping the harmonic component with a digital filter, filter delay time needs to be prolonged, so that relay operation time is delayed.

For the reason, an approximation method, which is not affected by harmonic theoretically even if such harmonics is contained has been employed in recent years.

An example of such approximation method will be described with reference to FIG. 1. Power transmission impedance constant up to a fault point F will be considered with reference to FIG. 1. Voltage and current of a protection relay installation point A are assumed to be v and i when resistance is R and inductance is L. If it is assumed that the voltage at the fault point F is zero, differential equation of a power transmission line 2 can be expressed in an expression (1).

$$V = R \cdot I + L \cdot (di/dt) \quad (1)$$

By calculating a differential item (di/dt) of the expression (1) approximately, detection accuracy can be improved even if harmonic is not removed with a filter. An example of a concrete method for digital calculation actually adapted is shown below.

$$v_m + v_{m-1} = R \cdot (i_m + i_{m-1}) + L \cdot (i_m - i_{m-1})$$

$$v_{m-1} + v_{m-2} = R \cdot (i_{m-1} + i_{m-2}) + L \cdot (i_{m-1} - i_{m-2}) \quad (2)$$

When a reactance value $X \, (=\omega_0 \cdot L)$ is calculated from the expression (2), the inductance is expressed in expression (3).

$$L_m = X_m/\omega_0 = \frac{(v_m + v_{m-1}) \cdot (i_{m-1} + i_{m-2}) - (v_{m-1} + v_{m-2}) \cdot (i_m + i_{m-1})}{(i_m - i_{m-1}) \cdot (i_{m-1} + i_{m-2}) - (i_{m-1} - i_{m-2}) \cdot (i_m + i_{m-1})} \quad (3)$$

$L_m/L$ (true value) is as expressed in the expression (4) under conditions of the expressions (5) and (6), so that frequency characteristic of $X_m/X$ (true value) is as indicated with the dotted curve of FIG. 2.

$$L_m/L(\text{true value}) = \tan(\omega_0 T/2)/\tan(\omega T/2) \quad (4)$$

Where, $i_m = I\sin(\omega t_m) \quad v_m = V\sin(\omega t + \theta)$ $$i_m - i_{m-1} = 2I\sin(\omega T/2)\cos(\omega t_m - \omega T/2) \quad (5)$$

$$v_m + v_{m-1} = 2V\cos(\omega T/2)\sin(\omega t_m - \omega T/2 + \theta) \quad (6)$$

Therefore, frequency characteristic of $X_m/X$ (true value) is as indicated with the dotted curve of FIG. 2.

In FIG. 2, its abscissa axis indicates frequency (order) and its ordinate axis indicates a reactance measurement value when basic frequency of system electrical quantity is 50 Hz. Further, in FIG. 2, its dotted curve indicates a case of sampling at 600 Hz and its solid line indicates a case of sampling at 4800 Hz.

As indicated in FIG. 2, the value of $L_m/L$ (true value) decreases below 1 as the frequency departs from its fundamental wave. FIG. 2 indicates that the value of $(\omega T/2)$ only should be suppressed to substantially 1 (that is, the sampling period should be set small) when this value $(L_m/L)$ is near twice or three times the fundamental wave.

Frequency characteristic when the sampling frequency is actually multiplied eight times is indicated by the solid line of FIG. 2. Qauntitavely, the relation between an approximate amount $(i_m - i_{m-1})$ of the differential item and a differentiated amount $(v_m + v_{m-1})$ is indicated by the expressions (7) and (8). Therefore, if the sampling frequency is raised (the period is decreased), approximation accuracy of the differential item can be raised.

$$\sin(\omega T/2) = \omega T/2 \quad \cos(\omega T/2) = 1$$

$$i_m - i_{m-1} = 2I \cdot \sin(\omega T/2) \cdot \cos(\omega t_m - \omega T/2) = 2I \cdot \omega T/2 \cdot \cos(\omega t_m - \omega T/2) \quad (7)$$

$$v_m + v_{m-1} = 2V \cdot \cos(\omega T/2) \cdot \sin(\omega t_m - \omega T/2 + \theta) = 2V \cdot \sin(\omega t_m - \omega T/2\theta) \quad (8)$$

However, the value of the expression (7) is a very small value with respect to an amplitude value I. Therefore, a relative value of noise (quantization error generated at the time of A/D conversion, white noise generated in an analog circuit) contained in sampling data $(i_m, i_{m-1})$ is increased thereby disabling practical use of this method.

For example, when the sampling period T is T=1/4800 sec, $\omega_0 = 2\pi \cdot 50$ Hz, the second item $\epsilon/(\omega 0T/2)$ on the right side of the expression (9) is amplified to about 30 times. An e in the expression (9) is noise error.

$$(i_m - i_{m-1})/(\omega_0 T/2) = 2I \cdot (\omega/\omega_0) \cdot \cos(\omega t_m - \omega T/2) + \epsilon/(\omega_0 T/2) \quad (9)$$

BRIEF SUMMARY OF THE INVENTION

Accordingly, an object of the present invention is to provide an improved protection relay.

A protection relay for determining whether or not a fault point of a power system exists in a predetermined range, according to a first aspect of the present invention includes filter for inputting sampling data of a voltage and a current in the power system to a digital filter having a predetermined transfer function and outputting a first voltage data and a first current data, and a second voltage data and a second current data normal to the first voltage data and the first current data, respectively; a calculation device for calculating a predetermined measurement value based on the first voltage data, the first current data, the second voltage data and the second current data at a first time and the first voltage data, the first current data, the second voltage data and the second current data at a second time different from the first time; and an operation decision device for performing an operation decision based on the predetermined measurement value obtained by the calculation device.

A protection relay for determining whether or not a fault point of a power system exists in a predetermined range, according to a second aspect of the present invention includes a filter in which sampling data of voltage and current in the power system is inputted to a predetermined transfer function so as to output first voltage data and first current data and second voltage data and second current data normal to the first voltage data and the first current data, respectively; polarized voltage value calculation device for inputting the first and second voltage data and the first and second current data so as to calculate a third voltage normal to the first voltage; and an operation decision device for performing an operation decision based on the third voltage.

A protection relay for determining whether or not a fault point of power system exists in a predetermined range, according to a third aspect of the present invention includes a first filter for inputting sampling data $v_m$ and $i_m$ of voltage a v and current i in the power system to a digital filter having transfer function $f(Z)\cdot(1+k\cdot Z^{-1}+Z^{-2})$ (Z indicates a Z conversion operator) so as to output voltage data $v_{sm}$ and current data $i_{sm}$; a second filter in which the sampling data $v_m$, $i_m$ are inputted to a digital filter having transfer function $f(Z)\cdot(1-Z^{-2})$ (Z indicates a Z conversion operator) so as to output voltage data $v_{jm}$ and current data $i_{jm}$ normal to the voltage data $v_{sm}$ and current data $i_{sm}$; a charging current compensation calculation device for calculating quantity of electricity defined in $i_{sm} - C\cdot v_{jm}$ by the current data $i_{sm}$, the voltage data $v_{jm}$, and a setting value $C_s$ at time $t_m$; a transmission and reception device for transmitting an output of the charging current compensation calculation to an opposite terminal and when quantity of electricity at the opposite terminal is assumed to be B, receiving quantity of electricity defined by $(i_{sm} - C\cdot v_{jm})B$ at the opposite terminal; and an operation decision device for performing an operation decision based on outputs from the charging current compensation calculation device and the transmission/reception means according to the following expression:

$$\|(i_{sm}-Cs\cdot v_{jm})+(i_{sm}-Cs\cdot v_{jm})B\| \geq ka\cdot\{\|i_{sm}-Cs\cdot v_{jm}\|+\|(i_{sm}-Cs\cdot v_{jm})B\|\}+kb$$

where, $\|am\|$ represents a quantity parallel to amplitude of AC quantity of electricity "a" at time $t_m$;

ka represents a proportion restricting coefficient; and kb represents minimum sensitivity current.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
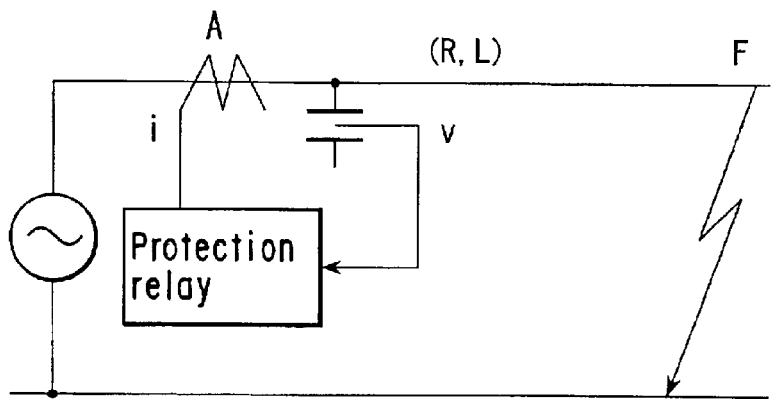
FIG. 1 is a power system diagram, which is an object of the present invention.
Figure 2:
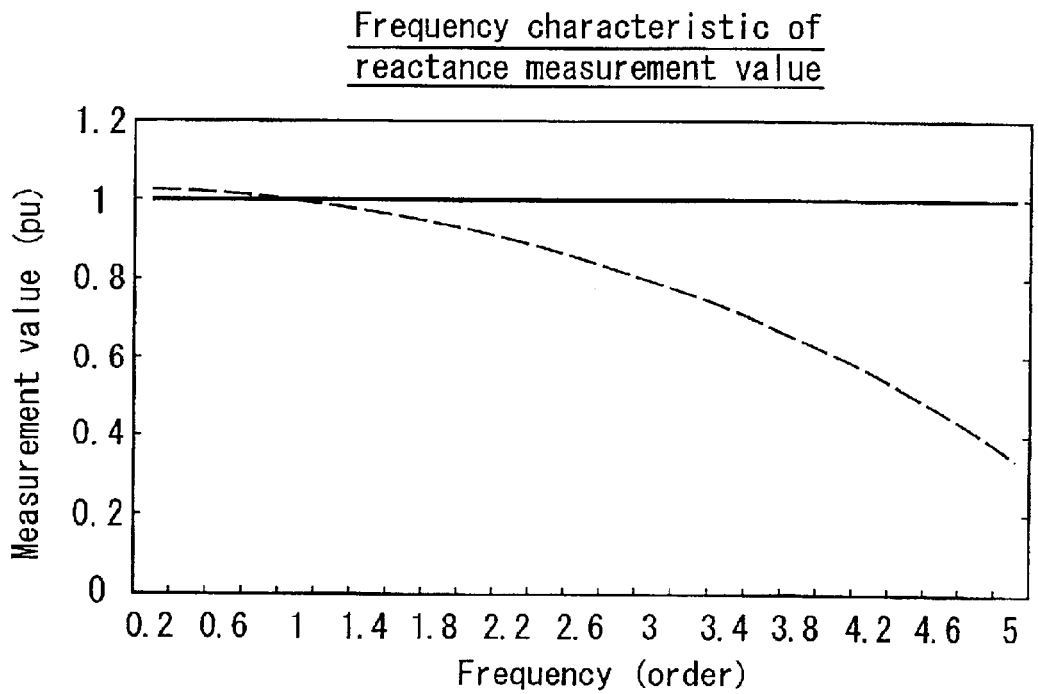
FIG. 2 is a diagram showing frequency characteristic of a reactance measurement value which is an object of the present invention.

Prior to description of respective embodiments of the present invention, the principle of the present invention will be described. If sampling data of current $i=I\cdot\sin(\omega t)$ is passed through transfer function $f(Z)-(1+Z^{-1}+Z^{-2}+\ldots +Z^{-n})$, current $i'_{sm}$ at time $t_m$ indicated in the expression (10) is obtained.

$$I'_{sm}=I\cdot(\sin(\omega t_m)+\sin(\omega t_m-\omega T)+\ldots+\sin(\omega t_m-n\omega T))=I\cdot(\sin((n+1)\omega T/2)/\sin(\omega T/2))\cdot\sin(\omega t_m-n\omega T/2) \quad (10)$$

If this current $i'_{sm}$ is passed through transfer function $(1+k\cdot Z^{-1}+Z^{-2})$, current $i_{sm}$ at time $t_m$ indicated in the expression (11) is obtained.

$$i_{sm}=i'_{sm}+k\cdot i'_{sm-1}+i'_{sm-2}=I\cdot(k+2\cos(\omega T))\cdot(\sin((n+1)\omega T/2)/\sin(\omega T/2))\cdot\sin(\omega t_m-(n+2)\omega T/2) \quad (11)$$

Likewise, current $i=I\cdot\sin(\omega t)$ is passed through the transfer function $f(Z)\cdot(1-Z^{-2})$, current $i_{jm}$ at time $t_m$ is obtained as indicated in the expression (12).

$$i_{jm}=2I\cdot\cos(\omega T/2)\sin((n+1)\omega T/2)\cdot\cos(\omega t_m-(n+2)\omega T/2) \quad (12)$$

Voltage can be obtained in the same manner as current and if it is assumed that the voltages are $v_{sm}$ and $v_{jm}$, they are in such a relation that they are normal to each other.

Thus, if as the fundamental wave, its value which is as near 1 as possible is selected as long as the quantity for determining the size of the right side of the expression (12) is not $|\sin((n+1)\omega T/2)|<<1$, performance of frequency characteristic can be assured while suppressing amplification of noise error.

Therefore, if $i_{jm}$, $i_{sm}$, and $v_{sm}$ at time $t_m$ and $i_{jm-1}$, $i_{sm-1}$, and $v_{sm-1}$ at time $t_{m-1}$ are substituted for:

$$x_m = \frac{-v_{sm} \cdot i_{sm-p} + i_{sm} \cdot v_{sm-p}}{-i_{jm} \cdot i_{sm-p} + i_{jm-p} \cdot i_{sm}} \quad (13)$$

where m and p represent sampling time series, voltage $v_{sm}$ is provided in the form of:

$$v_{sm} = V \cdot (k + 2\cos(\omega T)) \cdot (\sin((n+1)\omega T/2)/\sin(\omega T/2) \cdot \sin(\omega t_m + \theta - (n+2)\omega T/2) \quad (14)$$

As a result, a reactance value $X_m$ is indicated in the expression (15):

$$Xm = \frac{V(k + 2\cos(\omega T))}{I \sin(\omega T)} \cdot \sin(\theta) \quad (15)$$

where θ represents a leading angle of Voltage to current.

Figure 3:
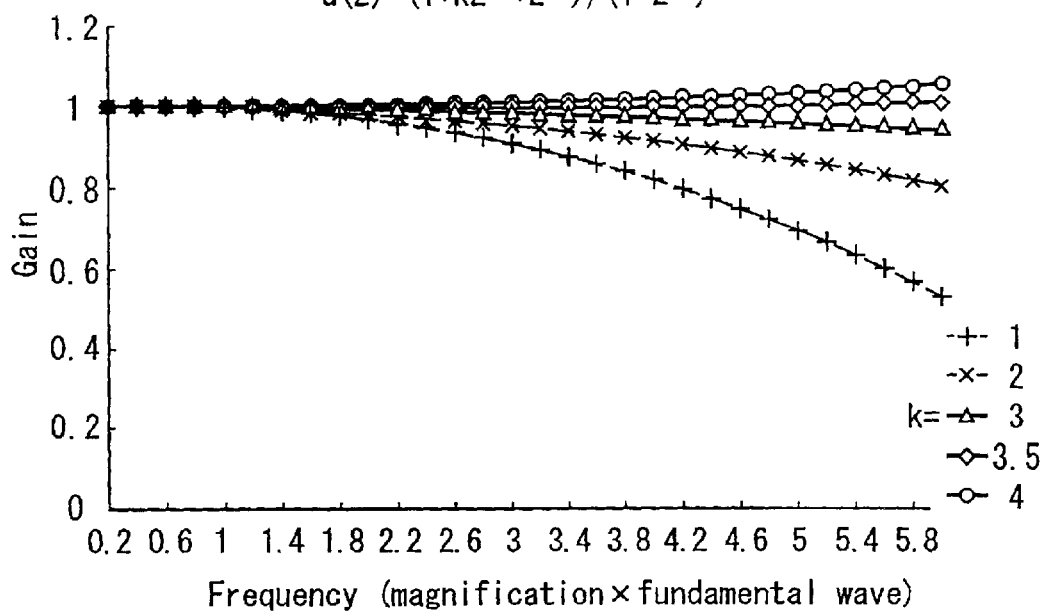
FIG. 3 is a diagram showing frequency characteristic of a reactance measurement value in a digital filter structure, which is an object of the present invention.

Therefore, when n is increased sufficiently in the expression (12), an influence of the noise error can be reduced. Frequency characteristic of $X_m$ relative to the fundamental wave can be indicated in a graph shown in FIG. 3. From this graph, it is evident that k=4 provides the most excellent frequency characteristic.

$Xm/X$ (value at fundamental wave) = (16)

$$\frac{(k + 2\cos(\omega T))/(k + 2\cos(\omega_0 T))}{\sin(\omega T)/\sin(\omega_0 T)}$$

Figure 4:
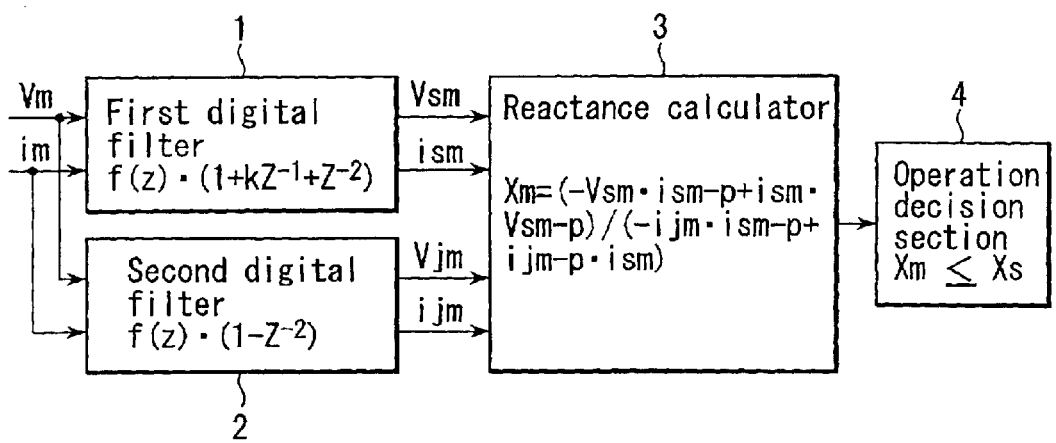
FIG. 4 is a block diagram of a protection relay according to a first embodiment of the present invention.

A protection relay according to a first embodiment of the present invention will be described based on the above-described principle with reference to FIG. 4. FIG. 4 is a block diagram showing schematically the structure of the protection relay according to the first embodiment. The protection relay of the first embodiment suppresses amplification of the noise error contained in minute quantity of data even when the sampling period is shortened, in order to secure performance of frequency characteristic indicated in the expression (4).

Referring to FIG. 4, a first (digital) filter 1 comprises a digital filter (Z indicates a Z conversion operator) which outputs sampling data $v_m$ and $i_m$ about voltage v and current i of a power system as voltage data $v_{sm}$ and current data $i_{sm}$ through transfer function $f(Z) \cdot (1 + k \cdot Z^{-1} + Z^{-2})$ and extracts predetermined frequency components of voltage and current of a power system (not shown), which is a protecting object.

A second (digital) filter 2 comprises a digital filter (Z indicates a Z conversion operator) which outputs sampling data $v_m$ and $i_m$ as voltage data $v_{jm}$ and $i_{jm}$ through transfer function $f(Z) \cdot (1 - Z^{-2})$ and extracts voltage and current normal to the first filter 1 in all frequency components.

A reactance value calculator 3 calculates a reactance value $X_m$ from voltage data $v_{sm}$, current data $i_{sm}$, voltage data $v_{jm}$ and voltage data $i_{jm}$ at time $t_m$ and voltage data $i_{sm-p}$, current data $i_{sm-p}$, voltage data $v_{jm-p}$ and current data $i_{jm-p}$ at time $t_{m-p}$.

An operation decision section 4 compares the reactance value $X_m$ obtained by the reactance calculator 3 with a preliminarily set integer (whether or not $X_m \leq X_s$ is determined with $X_s$). The preliminarily set integer value is called setting value in this specification.

With such a configuration, the first filter having the transfer function $f(Z) \cdot (1 + k \cdot Z^{-1} + Z^{-2})$ receives input of sampling data $v_m$ and $i_m$ about voltage v and current i of the power system and outputs voltage data $v_{sm}$ and current data $i_{sm}$.

Further, the second filter having the transfer function $f(Z) \cdot (1 - Z^{-2})$ receives input of sampling data $v_m$ and $i_m$ about the voltage v and current i and outputs voltage data $v_{jm}$ and current data $i_{jm}$.

The reactance value calculator 3 calculates a reactance value $X_m$ from the voltage data $v_{sm}$ and current data $i_{sm}$ obtained by the first filter 1 and voltage data $v_{jm}$ and current data $i_{jm}$ obtained by the second filter 2 at time $t_m$, and voltage data $v_{sm-p}$ and current data $i_{sm-p}$ obtained by the first filter 1 and voltage data $v_{jm-p}$ and current data $i_{jm-p}$ obtained by the second filter 2 at time $t_{m-p}$ according to the expression (17):

$$X_m = \frac{-v_{sm} \cdot i_{sm-p} + i_{sm} \cdot v_{sm-p}}{-i_{jm} \cdot i_{sm-p} + i_{jm-p} \cdot i_{sm}} \quad (17)$$

where, m and p represent sampling time series.

Further, the operation decision section 4 decides whether or not $X_m \leq X_s$ is established from the reactance value $X_m$ and setting value $X_s$ obtained by the reactance value calculator 3 and when that relation is established, it decides it is active and otherwise, it decides it is inactive.

The transfer functions of the first and second filters 1 and 2 are expressed in $f(Z) \cdot (1 + k \cdot Z^{-1} + Z^{-2})$ and $f(Z) \cdot (1 - Z^{-2})$ when the Z conversion operator is employed. As already described before, the outputs of the first and second filters 1 and 2 are normal to each other. There is a relation that the output of the first filter 1 is delayed at 90° with respect to the output of the second filter 2.

It is permissible to define these transfer functions with transfer function 1: $f(Z)$, transfer function 2: $(1 + k \cdot Z^{-1} + Z^{-2})$ and transfer function 3: $1 - Z^{-2}$ and form the first filter 1 and the second filter 2 by combining those.

That is, the same output can be obtained by passing the input voltage and current through a digital filter of the transfer function 1 and then passing its output through digital filters of the transfer functions 2 and 3.

The reactance value calculator 3 of FIG. 4 calculates a reactance value from a protection relay installation point in a power transmission line of FIG. 1 up to a fault point according to the expression (17). Assuming that the input voltage and current are $i = I \cdot \sin(\omega t)$, and $v = V \cdot \sin(\omega t + \theta)$, the expression (17) can be expressed in the expression (15).

The operation decision section 4 corrects the decision expression using the reactance value $X_m$, setting value $X_s$ and preliminarily set fundamental wave constant $\sin(\omega_0 T)/(k + 2 \cdot \cos(\omega_0 T))$ with respect to the reactance value $X_m$ calculated by the reactance value calculator 3 as indicated in the expression (18) so as to decide whether or not it is active. Such operation decision is carried out plural times ordinarily.

$$X_m \leq X_s/(\sin(\omega_0 \cdot T)/(k + 2 \cdot \cos(\omega_0 \cdot T))) \quad (18)$$

Consequently, amplification of error due to approximation of the differential item is suppressed, so that $L_m/L$ (true value) becomes a characteristic which is as near 1 as possible in a wide frequency band. Therefore, it is possible to block an influence even when a harmonic component occurs in fault voltage and fault current of the power system thereby improving reliability.

According to the above description, the reactance value calculator 3 calculates the reactance value using outputs of the first filter 1 and the second filter 2 and the operation decision section 4 decides whether or not it is active according to the condition expression (18) based on that reactance value.

The present invention is not restricted to this example, but it is permissible for an operating restarint quantity calculator 5 to calculate $a_m$ and $b_m$ according to the expression (19) based on the outputs of the first filter 1 and the second filter 2 and then for an operation decision section 6 to decide the operation according to the expression (20) to be described later using that result.

$$a_m = -v_{sm} \cdot i_{sm-p} + v_{sm-p} \cdot i_{sm}$$

$$b_m = -i_{jm} \cdot i_{sm-p} + i_{jm-p} \cdot i_{sm} \quad (19)$$

That is, when current $i = I \cdot \sin(\omega t)$ and voltage $v = V \cdot \sin(\omega t + \theta)$ are inputted to the first filter 1 of the transfer function $f(Z) \cdot (1 - k \cdot Z^{-1} + Z^{-2})$ and the second filter 2 of the transfer function $f(Z) \cdot (1 - Z^{-2})$, the expression (19) is converted to the expression (20), providing that $f(Z) = (1 + Z^{-1} + Z^{-2} + \ldots + Z^{-n})$.

$$a_m = IV\{(k + 2\cos(\omega T))^2 \cdot$$

$(\sin((n+1)\omega T/2)/\sin(\omega T/2))^2\} \cdot \sin(\theta) \cdot \sin(p\omega T) b_m = 2I^2\{\cos(\omega T2/) \cdot \sin((n+1)\omega T/2).$ $(k + 2\cos(\omega T)) \cdot (\sin((n+1)\omega T/2)/\sin(\omega T/2))\} \cdot \sin(p\omega T) \quad (20)$ The operation decision section 6 corrects sensitivity constant $K_0$ and reactance setting value $X_s$ to $X_s \leftarrow X_s/(\sin(\omega_0 T)/(k + 2\cdot\cos(\omega_0 T)))$ using $a_m$ and $b_m$ outputted in this way and decides the operation according to a decision expression of the expression (21).

$$b_m \cdot X_m - a_m \geq k_0 \quad (21)$$

Figure 6:
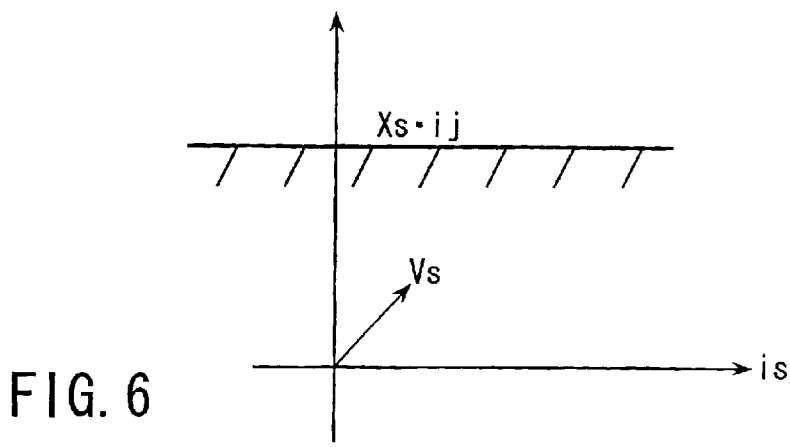
FIG. 6 is a diagram showing reactance characteristic on an impedance plane.

Although this is a different method from the above-described method, it has the reactance characteristic as shown in FIG. 6 like that example.

Consequently, amplification of error due to approximation of the differential item is suppressed, so that $L_m/L$ (true value) becomes a characteristic which is as near 1 as possible in a wide frequency band. Therefore, it is possible to block an influence even when a harmonic component occurs in fault voltage and fault current of the power system thereby improving reliability.

Figure 7:
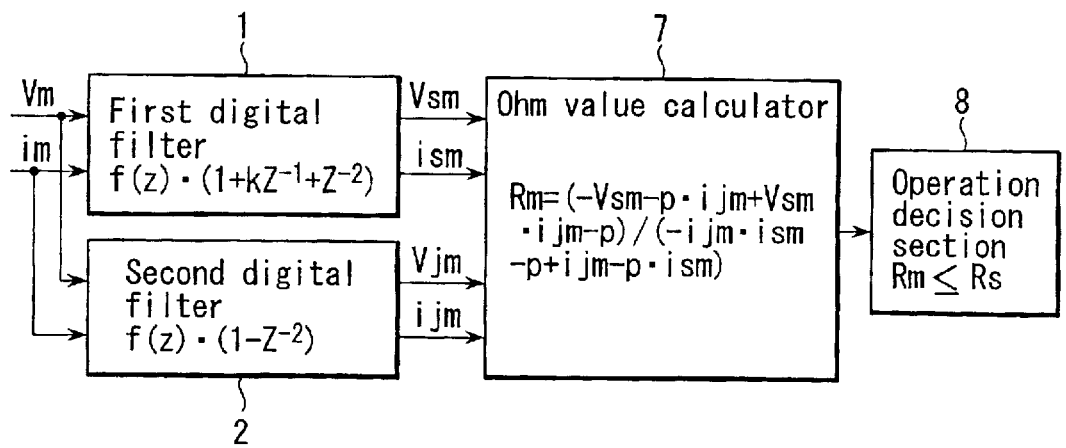
FIG. 7 is a block diagram of a protection relay according to a second modification of the first embodiment.

Further, it is permissible to use an Ohm value calculator 7 defined by expression (22) as shown in FIG. 7 as such calculation means or an operation decision section 8 defined by the expression (25), which will be described later.

$$R_m = \frac{-i_{jm} \cdot v_{sm-p} + v_{sm} \cdot i_{jm-p}}{-i_{jm} \cdot i_{sm-p} + i_{jm-p} \cdot i_{sm}} \quad (22)$$

With this configuration, when current $i = I \cdot \sin(\omega t)$ and voltage $v = V \cdot \sin(\omega t + \theta)$ are inputted into the first filter 1 of the transfer function $f(Z) \cdot (1 + k \cdot Z^{-1} + Z^{-2})$ and the second filter 2 of the transfer function $f(Z) \cdot (1 - Z^{-2})$, the expression (23) is established, providing that $f(Z) = (1 + Z^{-1} + Z^{-2} + \ldots + Z^{-n})$. Further, the Ohm value $R_m$ is converted to the expression (24) because of the relation of the expression (20).

$-i_{jm} \cdot v_{sm-p} + i_{jm-p} \cdot v_{sm} = 2IV\cos(\omega T/2) \cdot \sin((n+1)\omega T/2) \cdot (k + 2\cos(\omega T)).$ $(\sin((n+1)\omega T/2)/\sin(\omega T/2)) \cdot \cos(\theta) \cdot \sin(p\omega T) \quad (23)$ $R_m = (V/I) \cdot \cos(\theta) \quad (24)$ The operation decision section 8 decides whether or not a decision expression for the expression (25) is established based on the Ohm value $R_m$ and the setting value $R_s$ calculated from the expression (24) and when that expression is established, it decides it is active.

$$R_m \leq R_s \quad (25)$$

Consequently, amplification of error due to approximation of the differential item is suppressed, so that $L_m/L$ (true value) becomes a characteristic which is as near 1 as possible in a wide frequency band. Therefore, it is possible to block an influence even when a harmonic component occurs in fault voltage and fault current of the power system thereby improving reliability.

Further, it is permissible to use an operation restricting quantity calculator 9 defined by the expression (26) shown in FIG. 8 or an operation decision section 10 defined by the expression (28) which will be described later, as such calculation means.

$$c_m = -i_{jm} \cdot v_{sm-p} + v_{sm} \cdot i_{jm-p}$$

$$b_m = -i_{jm} \cdot i_{sm-p} + i_{jm-p} \cdot i_{sm} \quad (26)$$

That is, when current $i = I \cdot \sin(\omega t)$ and voltage $v = V \cdot \sin(\omega t + \theta)$ are inputted to the first filter 1 of the transfer function $f(Z) \cdot (1 - k \cdot Z^{-1} + Z^{-2})$ and the second filter 2 of the transfer function $f(Z) \cdot (1 - Z^{-2})$, the expression (26) is converted to the expression (27), providing that $f(Z) = (1 + Z^{-1} + Z^{-2} + \ldots + Z^{-n})$.

$m = -i_{jm} \cdot v_{sm-p} + i_{jm-p} \cdot v_{sm} = 2IV\cos(\omega T/2) \cdot \sin((n+1)\omega T/2) \cdot (k + 2\cos(\omega T)).$ $(\sin((n+1)\omega T/2)/\sin(\omega T/2)) \cdot \cos(\theta) \cdot \sin(p\omega T) \quad (27)$ Then, the operation decision section 10 decides whether or not it is active based on the decision expression (28) from $c_m$, $b_m$, Ohm setting value $R_s$ and sensitivity constant $K_l$.

$$R_s - c_m \geq k_l \quad (28)$$

Figure 9:
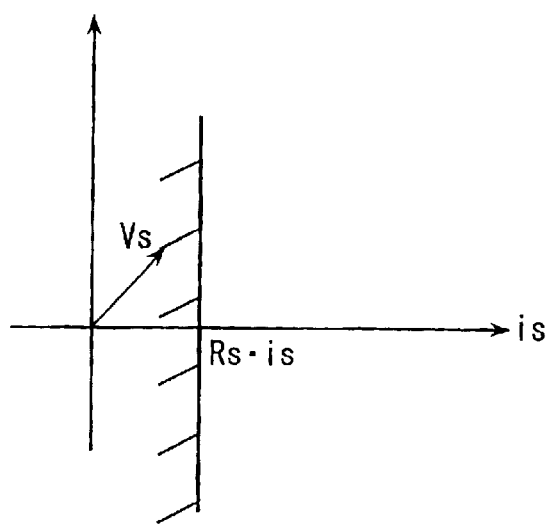
FIG. 9 is a diagram showing Ohm characteristic on an impedance plane.

Such protection relay has Ohm characteristic shown in FIG. 9 like the configuration described with reference to FIG. 7 before and is different from it only in its realization method.

Consequently, amplification of error due to approximation of the differential item is suppressed, so that $L_m/L$ (true value) becomes a characteristic which is as near 1 as possible in a wide frequency band. Therefore, it is possible to block an influence even when a harmonic component occurs in fault voltage and fault current of the power system thereby improving reliability.

Next, a second embodiment of the present invention will be described with reference to the accompanying drawings. A description of the same configuration as the above-described embodiment is omitted appropriately while like reference numerals are attached to the same components in the Figures.

Figure 5:
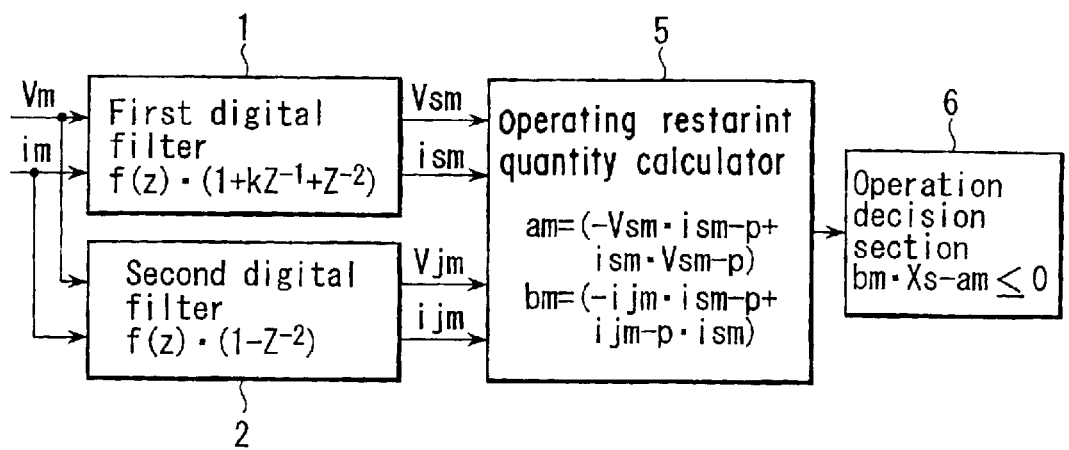
FIG. 5 is a block diagram of a protection relay according to a first modification of the first embodiment.
Figure 8:
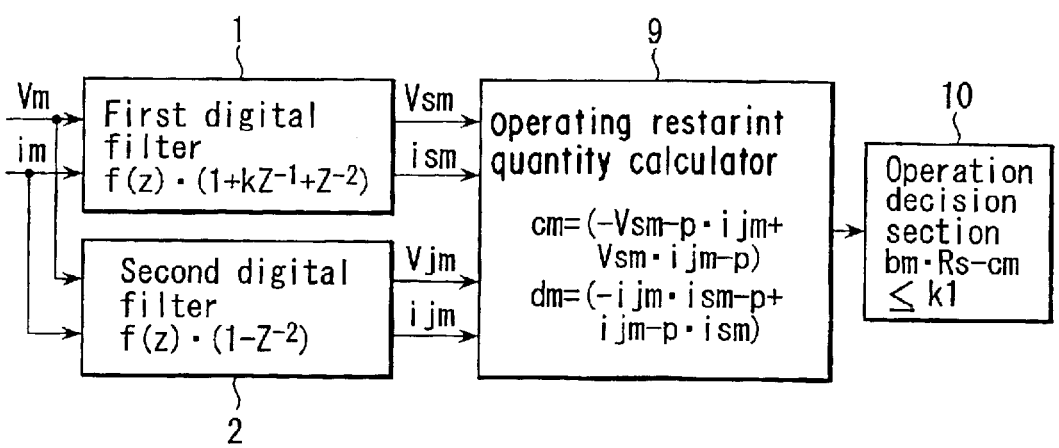
FIG. 8 is a block diagram of a protection relay according to a third modification of the first embodiment.

According to the first embodiment, for example, FIG. 4 indicates calculation of reactance and FIGS. 5, 8 indicate calculation of operating restarint quantity, and FIG. 7 indicates calculation of Ohm value and decision of operation based thereon.

Figure 10:
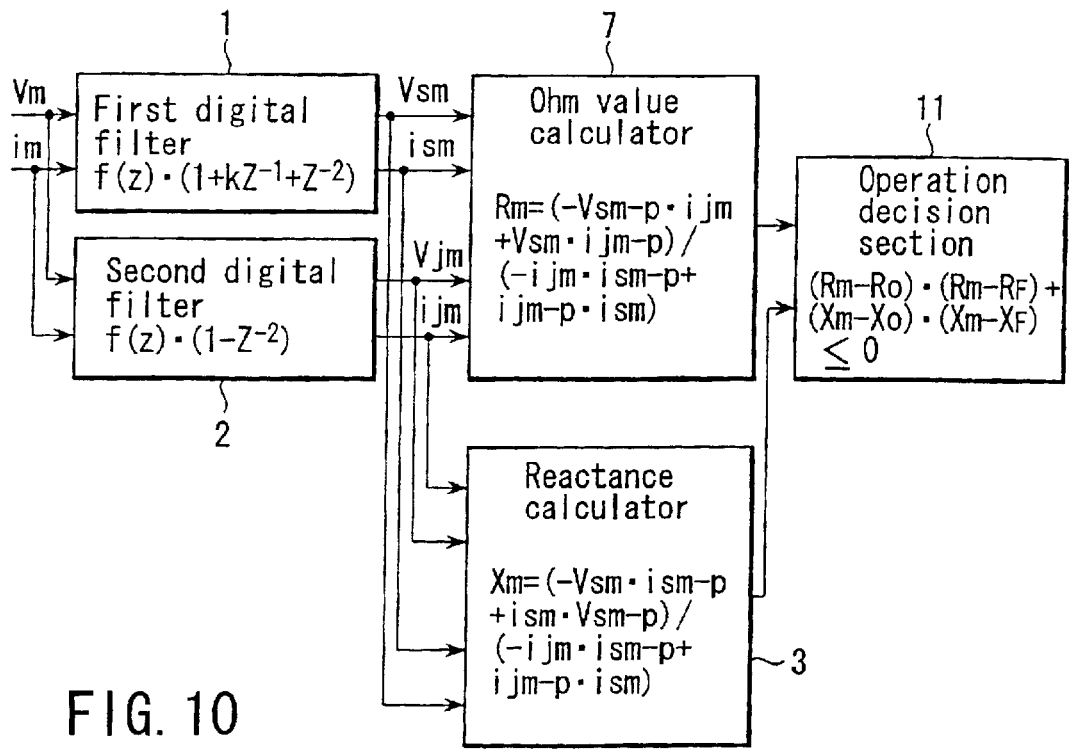
FIG. 10 is a block diagram of a protection relay according to a second embodiment of the present invention.
Figure 12:
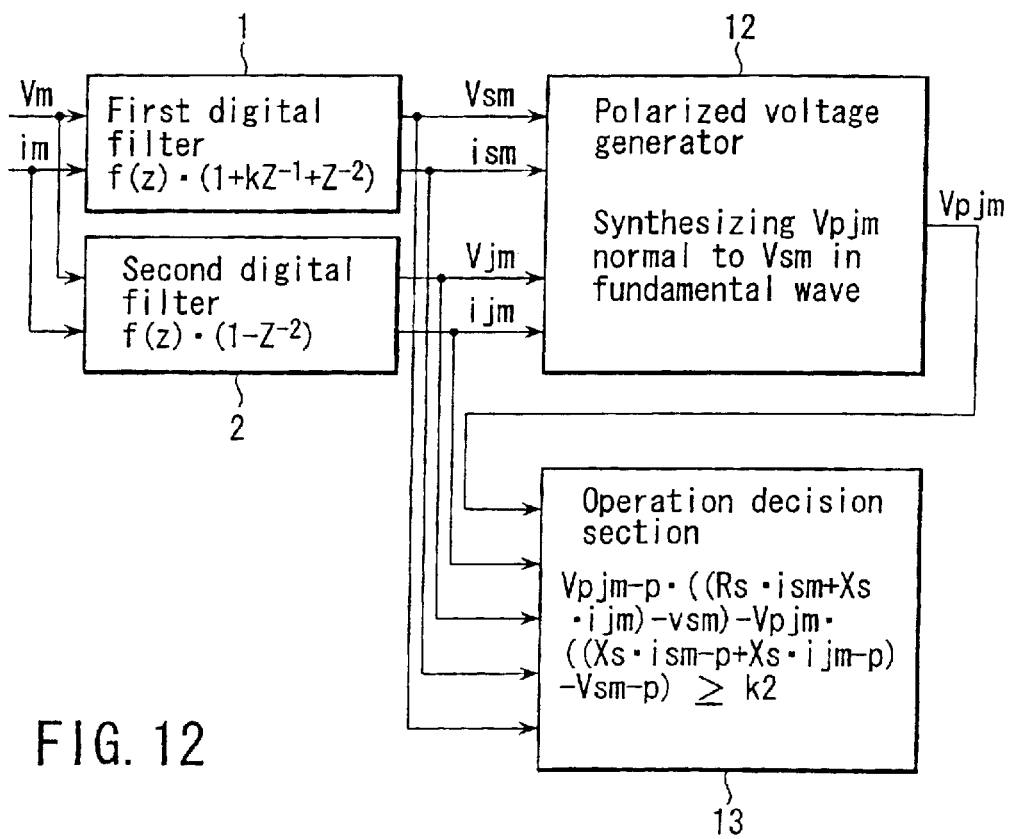
FIG. 12 is a block diagram of a protection relay according to a third embodiment of the present invention.

This embodiment contains the Ohm value calculator 7 and reactance value calculator 3 as shown in FIG. 10 and then, the operation decision section 11 decides the operation using these outputs.

That is, the voltage $v_{sm}$, current $i_{sm}$ and voltage $v_{jm}$, current $i_{jm}$ outputted from the first filter 1 and the second filter 2 are inputted to the Ohm value calculator 7 for calculating Ohm value and the reactance value calculator 3 for calculating reactance. The Ohm value calculator 7 calculates an Ohm value $R_m$ according to the expression:

$$R_m = \frac{-i_{jm} \cdot v_{sm-p} + v_{sm} \cdot i_{jm-p}}{-i_{jm} \cdot i_{sm-p} + i_{jm-p} \cdot i_{sm}}$$

The reactance value calculator 3 calculates reactance $X_m$ according to the expression (13).

Figure 11:
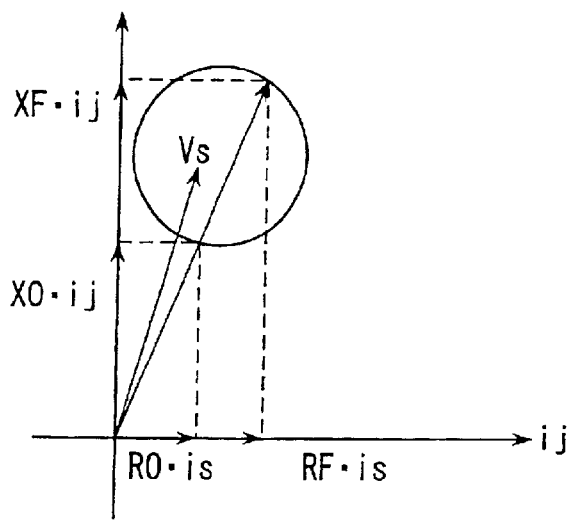
FIG. 11 is a diagram showing offset mho characteristic on an impedance plane.

The operation decision section 11 decides whether or not it is active according to the expression (29) using the Ohm value $R_m$ and the reactance value $X_m$. This protection relay has offset mho characteristic indicated in FIG. 11:

$$(R_m - R_0) \cdot (R_m - R_p) + (X_m - X_0) \cdot (X_m - X_F) \leq 0 \qquad (29)$$

where, $R_0$ (Ohm component) represents an offset mho near side setting value;

$X_0$ (reactance component) represents an offset mho near side setting value;

$R_F$ (Ohm component) represents an offset mho far side setting value; and $X_F$ (reactance component) represents an offset mho far side setting value.

A third embodiment of the present invention will be described with reference to the accompanying drawings. Description of the same configuration as the above-described embodiments is omitted while like reference numerals are attached thereto.

A protection relay of this embodiment comprises a polarized voltage value calculator 12 in which voltage $v_{sm}$, current $i_{sm}$ and voltage $v_{jm}$, current $i_{jm}$ are inputted in order to extract voltage $v_{pim}$ normal to voltage $v_{sm}$ and an operation decision section 13 in which the aforementioned voltages and currents are inputted while voltage $v_{pim}$ is inputted from the polarized voltage value calculator 12 so as to decide whether or not it is active according to the expression (30).

$$v_{pjm-p} \cdot ((R_s \cdot i_{sm} + X_s \cdot i_{jm}) - v_{sm}) - v_{pjm} \cdot \\ ((R_s \cdot i_{sm-p} + X_s \cdot i_{jm-p}) - v_{sm-p}) \geq K2 \qquad (30)$$

In the meantime, $R_s$ and $X_s$ are setting value s of an Ohm component and a reactance component respectively, while $X_s$ is corrected in the form of $X_s \leftarrow X_s/(\sin(\omega 0T)/(k+2\cos(\omega 0T)))$.

Figure 13:
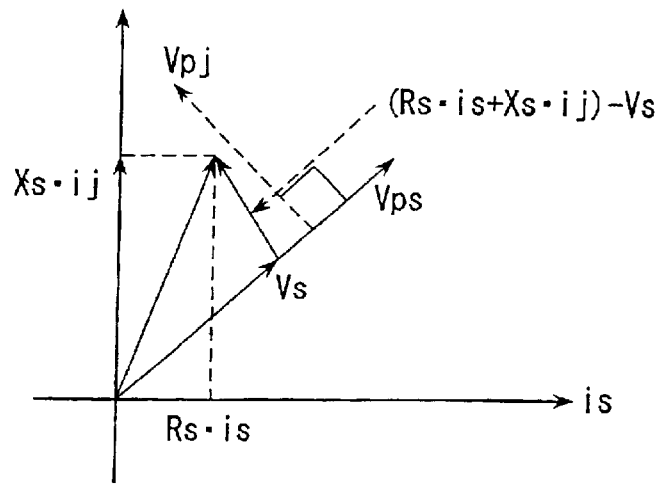
FIG. 13 is a diagram showing the relation between maximum sensitive angle of mho characteristic and permanent impedance.

In the expression (30), the quantities of electricity in the item of $(R_s \cdot i_{sm} + X_s \cdot i_{jm})$ and item of $(R_s \cdot i_{sm-p} + X_s \cdot i_{jm-p})$ are in such a relation that they are advanced only in size of $(R_s^2 + X_s^2)^{1/2}$ and phase of $\phi = \tan^{-1}(X_s/R_s)$ with respect to current $i_{sm}$. Its example will be shown in FIG. 13.

If current $i = I \cdot \sin(\omega t)$ and voltage $v = V \cdot \sin(\omega t + \theta)$ are inputted to the first filter 1 of the transfer function $f(Z) \cdot (1-k \cdot Z^{-1} + Z^{-2})$ and the second filter 2 of the transfer function $f(Z) \cdot (1-Z^{-2})$, the expression (31) is established, providing that $f(Z) = (1 + Z^{-1} + Z^{-2} + \ldots + Z^{-n})$:

$$V_{pj} \cdot \{R_s \cdot I_s \cdot \cos(\theta) + X_s/(\sin(\omega_0 T)/(k+2\cos(\omega_0 T))) \cdot I_j \cdot \sin(\theta)) - V_s\} \cdot \sin(p\omega T) \geq K2$$

where: $I_s = I(k+2\cos(\omega T))(\sin((n+1)\omega T/2)/\sin(\omega T/2))$ $V_s = V(k+2\cos(\omega T))(\sin((n+1)\omega T/2)/\sin(\omega T/2))$ $$I_j = 2I\cos(\omega T/2)\sin((n+1)\omega T/2) \qquad (31)$$

Figure 14:
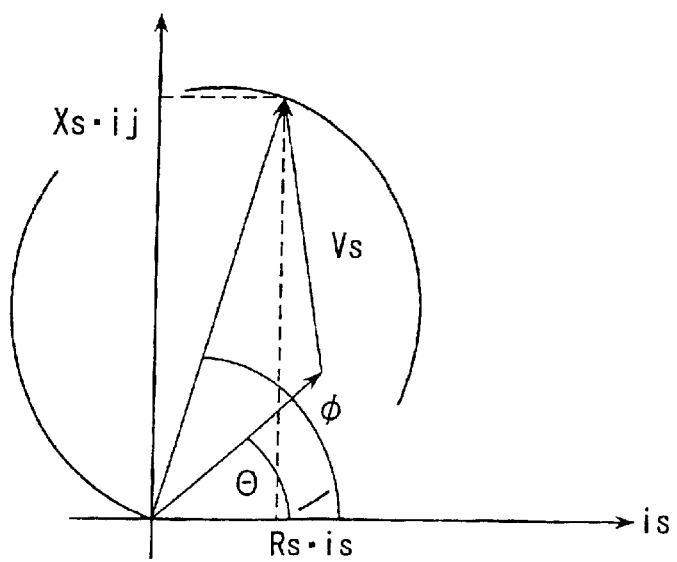
FIG. 14 is a diagram showing mho characteristic expressed with reference to current.

Then, if the expression (31) is expressed with Zs (size: $(R_s^2 + X_s^2)^{1/2}$ and phase $\phi = \tan^{-1}(X_s/R_s)$, expression (32) is established. Therefore, the expression (32) indicates operation principle expression of mho characteristic shown in FIG. 14 if its frequency is basic frequency.

$vpj \cdot \{(Zs \cdot Is \cdot \cos(\theta)\cos(\phi) + Zs \cdot Ij \cdot \sin(\theta)\sin(\phi)/ \\ (\sin(\omega_0 T)/(k+2\cos(\omega_0 T)) - Vs) \cdot \sin(p\omega T)\} = \\ Vpj \cdot \{Zs \cdot I \cdot (\cos(\theta)\cos(\phi)(k+2\cos(\omega T))/ \\ \sin(\omega T) + \sin(\theta)\sin(\phi)$ $$(k+2\cos(\omega_0 T))/\sin((\omega_0 T)) - Vs\} \cdot \sin(p\omega T) \cdot \omega = \\ \omega_0 = Vpj \cdot \{Zs \cdot I \cdot \cos(\theta - \phi) - Vs\} \cdot \sin(p\omega T) \geq K2 \qquad (32)$$

Figure 15:
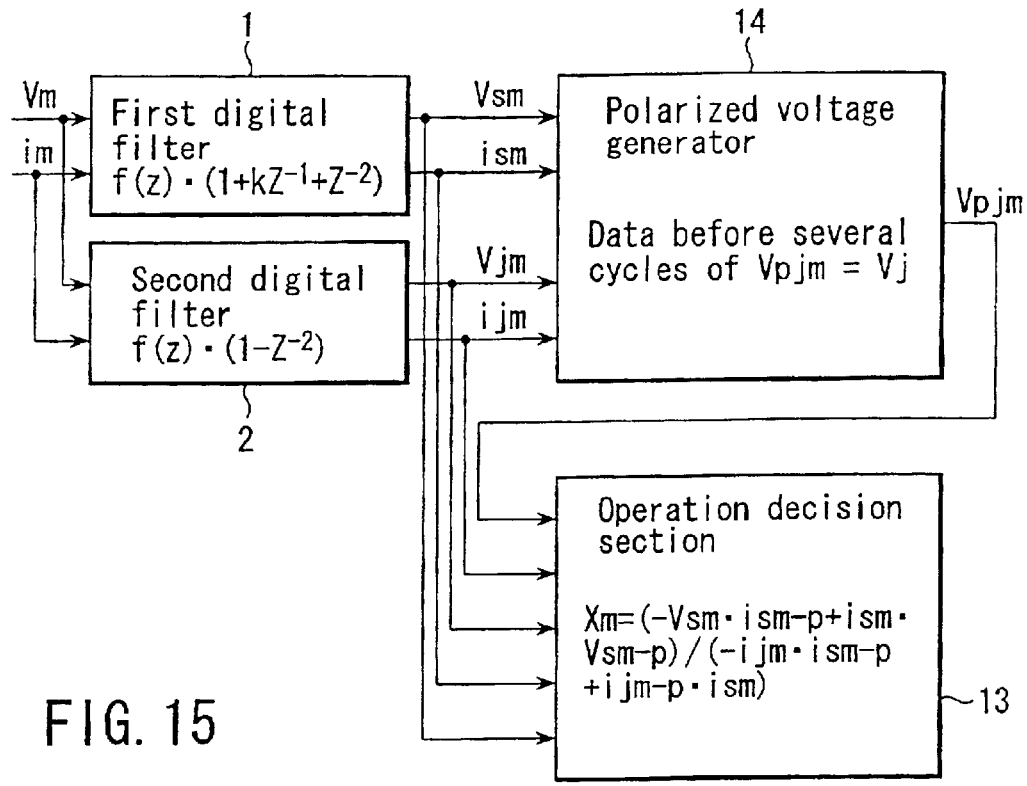
FIG. 15 is a block diagram of a protection relay according to a first modification of the third embodiment.

The above-described structure indicates a case where voltage $v_{pjm}$ normal to voltage $v_{sm}$ in the fundamental wave is extracted by the polarized voltage value calculator 12. The present invention is not restricted to this example. For example, it is permissible to provide with a polarized voltage value calculator 14 which regards a voltage before predetermined cycles (data before N samplings) of the voltage $v_{jm}$ normal to voltage $V_{sm}$ as polarized voltage as shown in FIG. 15. In this case, the voltage $v_{pjm}$ and voltage $v_{sm}$ are indicated in the expression (33).

$v_{pjm} = 2V \cdot \sin((n+1)\omega T/2) \cdot \cos(\omega T/2) \cdot \cos(\omega tm + \theta = N\omega T - (n+2)\omega T/2)$ $$v_{sm} = V \cdot (k+2\cos(\omega T)) \cdot \sin((n+1)\omega T/2)/ \\ \sin(\omega T/2) \cdot \sin(\omega tm + \theta - (n+2)\omega T/2) \qquad (33)$$

($N\omega_0 T = 2\pi \cdot M$, M is an integer)

Figure 16:
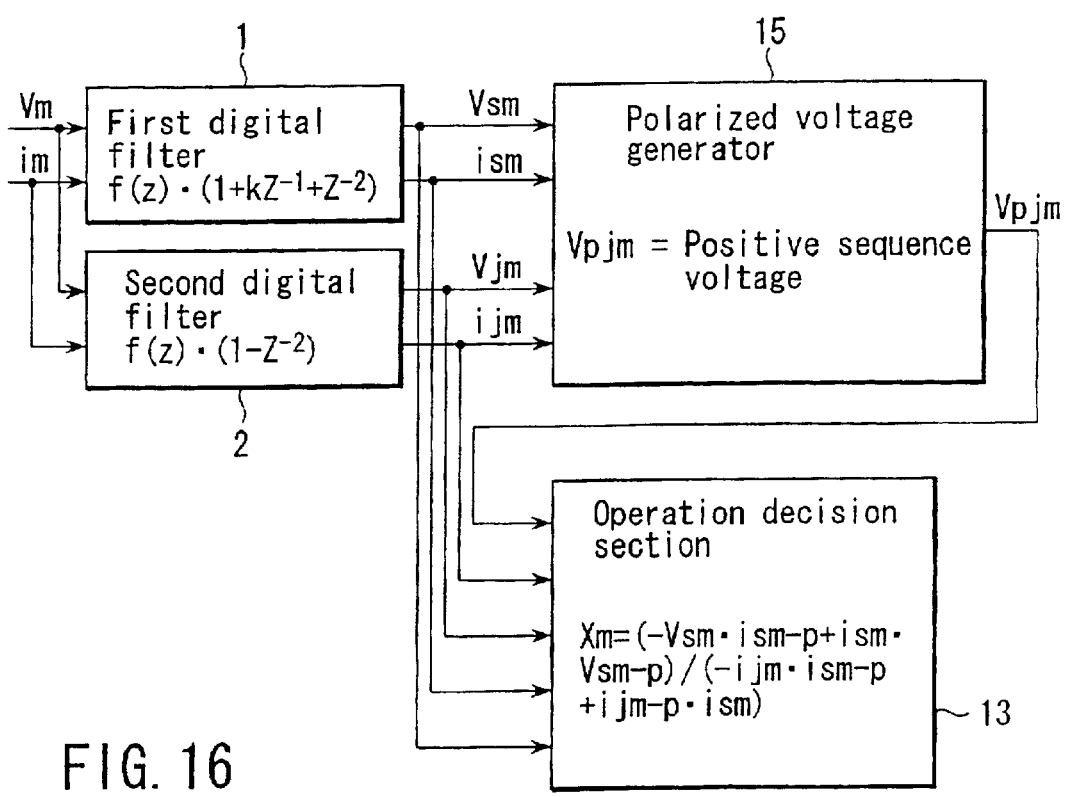
FIG. 16 is a block diagram of a protection relay according to a second modification of the third embodiment.

It is permissible to provide with a polarized voltage value calculator 15 for extracting voltage $v_{pim}$ normal to voltage $v_{sm}$ as shown in FIG. 16 and if this is for detecting a short-circuit, in case of, for example, AB phase, extract positive sequence voltage relative to the AB phase. A, B, and C indicate each phase of three-phase AC quantity of electricity.

For example, positive sequence voltage relative to the AB phase can be extracted according to $v_{psm}(AB) = -3^{1/2}(v_{jm}(C) - v_{jm}(0)) + v_{sm}(AB)$. Here, $v_{sm}(0)$ indicates zero phase quantity of electricity.

Further, if this is for ground fault, the positive sequence voltage relative to A phase can be calculated according to $v_{psm}(A) = 3^{1/2} \cdot (v_{sm}(A) - v_{sm}(0)) + v_{jm}(BC)$.

In addition to the method for extracting voltage vector from two electricity quantities normal to each other, it is permissible to apply a method in which sampling time series is shifted by 90° or equivalent.

Consequently, amplification of error due to approximation of the differential item is suppressed, so that $L_m/L$ (true value) becomes a characteristic which is as near 1 as possible in a wide frequency band. Therefore, it is possible to block an influence even when a harmonic component occurs in fault voltage and fault current of power system thereby improving reliability.

A fourth embodiment of the present invention will be described with reference to FIG. 17. Description of the same configuration as the above-described embodiments is omitted while like reference numerals are attached thereto.

Figure 17:
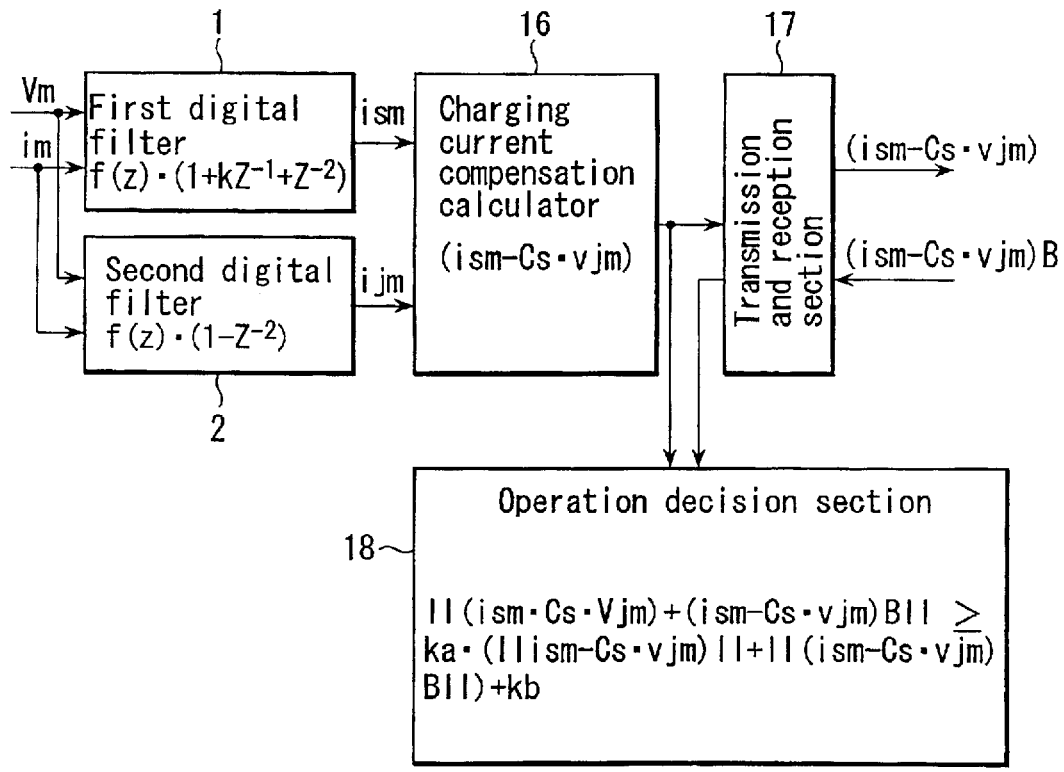
FIG. 17 is a block diagram of a protection relay according to a fourth embodiment of the present invention.

FIG. 17 is a block diagram of a protection relay applied to description of this embodiment. According to the fourth embodiment, outputs from the first filter 1 and the second filter 2 are inputted to a charging current compensation calculator 16 and its output is inputted to an operation decision section 18 which follows operation decision principle of ratio differential relay type so as to decide whether or not it is active.

The charging current compensation calculator 16 corrects a setting value $C_s$ in the form of $C_s \leftarrow C_s \cdot (k+2\cos(\omega_0 T)/\sin(\omega_0 T)$ and calculates $i_{sm} \cdot C_s \cdot v_{jm}$ using output current $i_{sm}$ from the first filter 1 and output voltage $v_{jm}$ from the second filter 2. In the meantime, $C_s \cdot v_{jm}$ indicates current compensation generated by charge capacity $C_s$.

Then, opposing quantity of electricity $(i_{sm} - C_s \cdot v_{jm})B$ of an opposite terminal is received by transmission and reception section 17 and quantity of electricity of itself terminal is transmitted to the electric power station. Here, B indicates quantity of electricity at an opposite terminal.

After that, the operation decision section 18 decides the operation based on vectorial sum of current which compensates for charge current at itself terminal obtained by the charging current compensation calculator 16 and current which compensates for charge current at a terminal of the opposite terminal, namely, scalar sum of amplitude value of differential current and currents which compensate for charge current at each terminal, according to expression (34):

$$\|(i_{sm}-Cs\cdot v_{jm})+(i_{sm}-Cs\cdot v_{jm})B\| \geq ka\cdot\{\|(i_{sm}-Cs\cdot v_{jm})\|+ \|(i_{sm}-Cs\cdot v_{jm})B\|\}+kb \quad (34)$$

where, $\|am\|$ represents quantity parallel to amplitude of AC quantity of electricity at time $t_m$;

ka represents a proportion restricting coefficient; and kb represents minimum sensitivity current.

Figure 18:
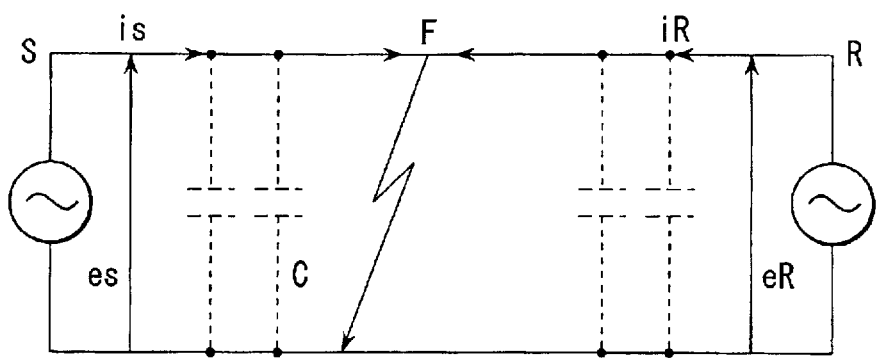
FIG. 18 is a diagram for explaining a telegraph equation of a power transmission line.

Physical meaning of the charging current compensation indicated in the expression (34) will be described with reference to a power transmission line in FIG. 18. A well known telegraph equation is expressed at transmission/reception terminal as shown in expression (35). Then, if Taylor expansion approximation is executed on differential current $i_{DD}$ (t) with the condition of ($\tau \approx 0$), the expression (36) is obtained:

Waveform of forward movement:

$$i_{DF}(t)=i_s(t-\tau)+e_s(t-\tau)/z+i_R(t+\tau)-e_R(t+\tau)/z$$

Waveform of backward movement:

$$i_{DB}(t)=i_s(t-\tau)-e_s(t-\tau)/z+i_R(t+\tau)+e_R(t+\tau)/z$$

Differential current: $i_{DD}(t)=(i_{DF}(t)+i_{DB}(t))/2$ \quad (35)

where, suffix S represents a transmitting terminal;

R represents a receiving terminal;

Z represents a surge impedance=; and $\tau$ represents propagation time=$1/v$ (LC).

$$i_{DD}(t) = i_s(t) - (\tau/z)\frac{de_s(t)}{dt} + (\tau^2/z)\frac{d^2e_s(t)}{dt^2} - (\tau^3/3!z)\frac{d^3e_s(t)}{dt^3}\ldots+ \quad (36)$$
$$i_R(t) - (\tau/z)\frac{de_R(t)}{dt} + (\tau^2/z)\frac{d^2e_R(t)}{dt^2} - (\tau^3/3!z)\frac{d^3e_R(t)}{dt^3}$$

$\because \tau/Z = \Sigma C/2$(½ charge capacity in entire SR interval)

Even if differential current is extracted with only current vectorial sum current (is(t)+iR(t)) at the transmission/reception terminal, the aforementioned charge current component becomes error current, thereby inducing a drop of sensitivity of the differential relay. Thus, only a fault current component can be extracted by compensating for this.

$$i_{DD}(t) = i_s(t) - (\tau/z)\frac{de_s(t)}{dt} + i_R(t) - (\tau/z)\frac{de_R(t)}{dt} \quad (37)$$

In the above description, the transfer function f(Z) in the first filter 1 and the second filter 2 has been described in the form of $f(Z)=(1+Z^{-1}+Z^{-2}+ \ldots +Z^{-n})$ It is evident that the same effect can be obtained even if the transfer function is $f(Z)=(1+Z^{-2}+Z^{-4}+ \ldots +Z^{-2n})$.

In this case, in the expression (10), $\omega T/2$ only should be replaced for $\omega T$ and in that case, the expression (38) is established. Likewise, the expressions (8) and (12) only should be replaced. For convenience of following description, it is described that $f1=f(Z)=(1+Z^{-1}+Z^{-2}+ \ldots +Z^{-n})$, and $f2=f(Z)=(1+Z^{-2}+Z^{-4}+ \ldots +Z^{-2n})$.

$$i'_{sm}=I\cdot(\sin(\omega t_m)+\sin(\omega t_m-2\omega T)+\ldots+ \sin(\omega t_m-2n\omega T))=I\cdot(\sin((n+1)\omega T)/\sin(\omega T))\cdot\sin(\omega t_m-n\omega T) \quad (38)$$

If f1 is replaced to f2, the quantity of data in the latter can be reduced assuming that the window length of data for use is the same and approximation error of integration is of the same value. For example, if n=2 is adapted in case of f1, n=1 may be adapted in case of f2.

Because gain in the first filter 1 and the second filter 2 using f1 is larger than gain in the first filter 1 and the second filter 2 using f2, noise error can be compressed by that amount.

For example, when f1 is used, gain G1 of n=2 is expressed in the expression (39) and if f2 is used, gain G2 of n=2 is expressed in the expression (40).

$$G1=|\sin(3\omega T/2)/\sin(\omega T/2)|=|2\cos(\omega T)+1| \quad (39)$$

$$G2=|\sin(2\omega T)/\sin(\omega T)|=|2\cos(\omega T)| \quad (40)$$

Such transfer function f(Z) is constructed with FIR fileter. The present invention is not restricted to this example, but the same integration error characteristic can be achieved even when it is constructed with recursive digital filter.

Consequently, amplification of error due to approximation of the differential item is suppressed, so that $L_m/L$ (true value) becomes a characteristic which is as near 1 as possible in a wide frequency band. Therefore, it is possible to block an influence even when a harmonic component occurs in fault voltage and fault current of the power system thereby improving reliability.

According to the present invention, as described above, even when a harmonic component is overlaid on a fault current and a fault voltage generated upon a fault of a power system, a predetermined time differential equation can be solved approximately by passing through predetermined digital filters normal to each other in a wide frequency band, thereby achieving a high accuracy protection relay.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protection relay for determining whether or not a fault point of a power system exists in a predetermined range, comprising:

filter means for inputting sampling data of a voltage and a current in the power system to a digital filter having a predetermined transfer function and outputting first voltage data and first current data, and second voltage data and second current data normal to the first voltage data and the first current data, respectively;

calculation means for calculating a predetermined measurement value based on the first voltage data, the first current data, the second voltage data and the second current data at a first time and the first voltage data, the first current data, the second voltage data and the second current data at a second time different from the first time; and operation decision means for performing an operation decision based on the predetermined measurement value obtained by the calculation means, wherein the filter means comprises:
  first filter means for inputting the sampling data to a digital filter having a first transfer function $f(Z) \cdot (1+k \cdot Z^{-1}+Z^{-2})$ (Z indicates a Z conversion operator) so as to output the first voltage data and the first current data; and
  second filter means for inputting the sampling data to a digital filter having a second transfer function $f(Z) \cdot (1-Z^{-2})$ so as to output the second voltage data and the second current data.

2. The protection relay according to claim 1, wherein the predetermined measurement value obtained by the calculation means comprises at least one of a reactance value and an ohmic value.

3. The protection relay according to claim 2, wherein:
the sampling data is $v_m$ and $i_m$ at the first time $t_m$;
the first voltage data is $v_{sm}$ and the first current data is $i_{sm}$; and
the second voltage data is $v_{jm}$ and the second current data is $i_{jm}$ normal to the first voltage data $v_{sm}$ and the first current data $i_{sm}$,
the calculation means calculates a reactance value $X_m$ based on:

$$X_m = \frac{-v_{sm} \cdot i_{sm-p} + i_{sm} \cdot v_{sm-p}}{-i_{jm} \cdot i_{sm-p} + i_{jm-p} \cdot i_{sm}}$$

using the first voltage data $v_{sm}$, the first current data $i_{sm}$, the second voltage data $v_{jm}$ and the second current data $i_{jm}$ at the first time $t_m$ and the first voltage data $v_{sm-p}$, the first current data $i_{sm-p}$, the second voltage data $v_{jm-p}$ and the second current data $i_{jm-p}$ at the second time $t_{m-p}$, and
the operation decision means decides the operation based on the calculated reactance value $X_m$.

4. The protection relay according to claim 3, wherein the operation decision means decides the operation based on a decision expression $X_m \leq X_s$ based on the reactance value $X_m$ and a setting value $X_s$.

5. The protection relay according to claim 3, wherein the calculation means calculates an ohmic value $R_m$ based on: the first voltage data $v_{sm}$, the first current data $i_{sm}$, the second voltage data $v_{jm}$ and the second current data $i_{jm}$ at the first time $t_m$ and the first voltage data $v_{sm-p}$, the first current data $i_{sm-p}$, the second voltage data $v_{jm-p}$ and the second current data $i_{jm-p}$ at the second time $t_{m-p}$ the ohmic value $R_m$ is calculated based on $$R_m = \frac{-i_{jm} \cdot v_{sm-p} + v_{sm} \cdot i_{jm-p}}{-i_{jm} \cdot i_{sm-p} + i_{jm-p} \cdot i_{sm}}, \text{ and}$$

the operation decision means decides the operation based on the calculated reactance value $X_m$ obtained from the calculation means according to a decision expression:

$$(R_m-R_0) \cdot (R_m-R_F)+(X_m-X_0) \cdot (X_m-X_F) \leq 0$$

where, $R_0$ (ohmic component) represents an offset mho near side setting value;
$X_0$ (reactance component) represents an offset mho near side setting value;
$R_F$ (ohmic component) represents an offset mho far side setting value; and
$X_F$ (reactance component) represents an offset mho far side setting value.

6. The protection relay according to claim 2, wherein
the sampling data is $v_m$ and $i_m$ at the first time $t_m$;
the first voltage data is $v_{sm}$ and the first current data is $i_{sm}$; and
the second voltage data is $v_{jm}$ and the second current data is $i_{jm}$ normal to the first voltage data $v_{sm}$ and the first current data $i_{sm}$; and
the calculation means calculates an ohmic value $R_m$ using the first and second voltage data $v_{sm}$ and $v_{jm}$ and the first and second current data $i_{sm}$, and $i_{jm}$ at the first time $t_m$, and the first and second time $t_{m-p}$, which are obtained by the first filter means and second filter means, and
the operation decision means decides the operation based on the calculated ohmic value $R_m$ obtained from the calculation means.

7. A protection relay for determining whether or not a fault point of a power system exists in a predetermined range, comprising:
  filter means in which sampling data of voltage and current in the power system is inputted to a predetermined transfer function so as to output first voltage data and first current data and second voltage data and second current data normal to the first voltage data and the first current data, respectively;
  polarized voltage value calculation means for inputting the first and second voltage data and the first and second current data so as to calculate a third voltage normal to the first voltage; and
  operation decision means for performing an operation decision based on the third voltage, wherein
the filter means comprises:
  first filter means for inputting the sampling data to a digital filter having a first transfer function $f(Z) \cdot (1+k \cdot Z^{-1}+Z^{-2})$ (Z indicates a Z conversion operator) so as to output the first voltage data and the first current data; and
  second filter means for inputting the sampling data to a digital filter having a second transfer function $f(Z) \cdot (1-Z^{-2})$ so as to output the second voltage data and the second current data.

8. The protection relay according to claim 7, wherein
the polarized voltage value calculation means calculates the third voltage $v_{pjm}$ based on the first voltage data $v_{sm}$, the first current data $i_{sm}$, the second voltage data $v_{jm}$, and the second current data $i_{jm}$, and
the operation decision means decides the operation based on:

$$v_{pjm-p} \cdot \{(R_s \cdot i_{sm}+X_s \cdot i_{jm})-v_{sm}\}-v_{pjm} \cdot \{(R_s \cdot i_{sm-p}+X_s \cdot i_{jm-p})-v_{sm-p}\} > K_2$$

using the third voltage $v_{pjm}$; the first voltage data $v_{sm}$, the first current data $i_{sm}$, the second voltage data $v_{jm}$, the second current data $i_{jm}$ at the first time $t_m$ and first voltage data $v_{jm-p}$, first current data $i_{jm-p}$ at a second time $t_{m-p}$ and a setting value $(R_s, X_s)$.

9. The protection relay according to claim 7, wherein the polarized voltage value calculation means calculates a voltage before predetermined cycles of a voltage normal to the first voltage as the third voltage.

10. A protection relay for determining whether or not a fault point of a power system exists in a predetermined range, comprising:
  first filter means for inputting sampling data $v_m$ and $i_m$ of a voltage v and a current i in the power system to a digital filter having a transfer function $f(Z) \cdot (1+k \cdot Z^{-1} + Z^{-2})$ (Z indicates a Z conversion operator) so as to output voltage data $v_{sm}$ and current data $i_{sm}$;

second filter means for inputting the sampling data $v_m$ and $i_m$ to a digital filter having a transfer function $f(Z) \cdot (1-Z^{-2})$ so as to output voltage data $v_{jm}$ and current data $i_{jm}$ normal to the voltage data $v_{sm}$ and the current data $i_{sm}$;

charging current compensation calculation means for calculating a quantity $i_{sm} - C \cdot v_{jm}$ based on by the current data $i_{sm}$, the voltage data $v_{jm}$, and a setting value $C_s$ at a time $t_m$;

transmission and reception means for transmitting an output of the charging current compensation calculation means to an opposite terminal and when said quantity at the opposite terminal is B, receiving another quantity defined by $(i_{sm} - C \cdot v_{jm})B$ at the opposite terminal; and operation decision means for performing an operation decision based on outputs from the charging current compensation calculation means and the transmission and reception means according to the following expression:

$$\|(i_{sm}-Cs \cdot v_{jm}) + (i_{sm}-Cs \cdot v_{jm})B\| \geq ka \cdot \{\|i_{sm}-Cs \cdot v_{jm}\| + \|(i_{sm}-Cs \cdot v_{jm})B\|\} + kb$$

where, $\| \; \|$ represents an amplitude of an AC quantity at the time $t_m$;

ka represents a proportion restricting coefficient; and kb represents a minimum sensitivity current.

11. A protection relay for determining whether or not a fault point of a power system exists in a predetermined range, comprising:

a first digital filter having applied thereto inputs including sampling data of voltage and current of the power system and having a first transfer function $f(Z) \cdot (1+k \cdot Z^{-1} + Z^{-2})$ (Z indicates a Z conversion operator) so as to output first voltage data and first current data;

a second digital filter having applied thereto inputs including the sampling data of the voltage and the current of the power system and having a second transfer function $f(Z) \cdot (1-Z^{-2})$ so as to output second voltage data and second current data, said second voltage data and said second current data being normal to the first voltage data and the first current data, respectively;

a calculation device configured to calculate a predetermined measurement value based on the first voltage data, the first current data, the second voltage data and the second current data obtained from said first and second digital filters at a first time and at a second time, the second time being different from the first time; and an operation device configured to perform an operation decision based on the calculated predetermined measurement value obtained from the calculation device.

* * * * *